United States Patent

Kaplan

[11] Patent Number: 5,171,459
[45] Date of Patent: Dec. 15, 1992

[54] SCALE DEPOSITION INHIBITOR

[75] Inventor: Roy I. Kaplan, Missouri City, Tex.

[73] Assignee: Nalco Chemical Company, Naperville, Ill.

[21] Appl. No.: 850,468

[22] Filed: Mar. 11, 1992

Related U.S. Application Data

[63] Continuation-in-part of Ser. No. 694,008, Apr. 30, 1991, abandoned.

[51] Int. Cl.$^5$ .............................................. E21B 37/00
[52] U.S. Cl. ................... 252/8.552; 166/250; 166/312
[58] Field of Search ............ 252/8.552; 166/250, 166/312

[56] References Cited

U.S. PATENT DOCUMENTS

| | | | |
|---|---|---|---|
| 3,336,221 | 8/1967 | Ralston | 210/58 |
| 3,613,788 | 10/1971 | Kautsky | 252/8.552 X |
| 3,945,437 | 3/1976 | Chiu et al. | 252/8.554 X |
| 4,013,569 | 3/1977 | Chiu et al. | 252/8.554 |
| 4,045,084 | 8/1977 | Hsueh et al. | 175/69 X |
| 4,116,488 | 9/1978 | Hsueh et al. | 299/4 |
| 4,291,920 | 9/1981 | Lingane et al. | 299/4 |
| 4,357,248 | 11/1982 | Berkshire et al. | 252/8.552 |
| 4,393,938 | 7/1983 | Lawson et al. | 252/8.552 X |
| 4,426,303 | 1/1984 | Nuckels | 252/8.554 |
| 4,499,006 | 2/1985 | Valone et al. | 252/8.555 X |
| 4,532,051 | 7/1985 | Nuckels nee Byth et al. | 252/8.554 X |
| 4,599,182 | 7/1986 | Young et al. | 252/8.553 |
| 4,602,683 | 7/1986 | Meyers | 166/279 |
| 4,605,068 | 8/1986 | Young et al. | 252/8.551 X |
| 4,762,626 | 8/1988 | Emmons et al. | 252/8.552 |
| 4,860,829 | 8/1989 | Carlberg et al. | 252/8.552 X |
| 5,018,577 | 5/1991 | Pardue et al. | 166/312 X |

*Primary Examiner*—Gary L. Geist
*Attorney, Agent, or Firm*—Daniel N. Lundeen; Robert A. Miller

[57] ABSTRACT

A aqueous oil well scale inhibiting composition is disclosed as well as a dispersion and scale inhibiting method. The inhibitor comprises a phosphate ester or phosphonate calcium carbonate inhibitor and a sulfonated alkyldiphenylether zinc and/or lead sulfide dispersant. The dispersion includes at least 1 ppm of effectively dispersed zinc and/or lead sulfide particulates up to a concentration of about 200 ppm or more.

20 Claims, 1 Drawing Sheet

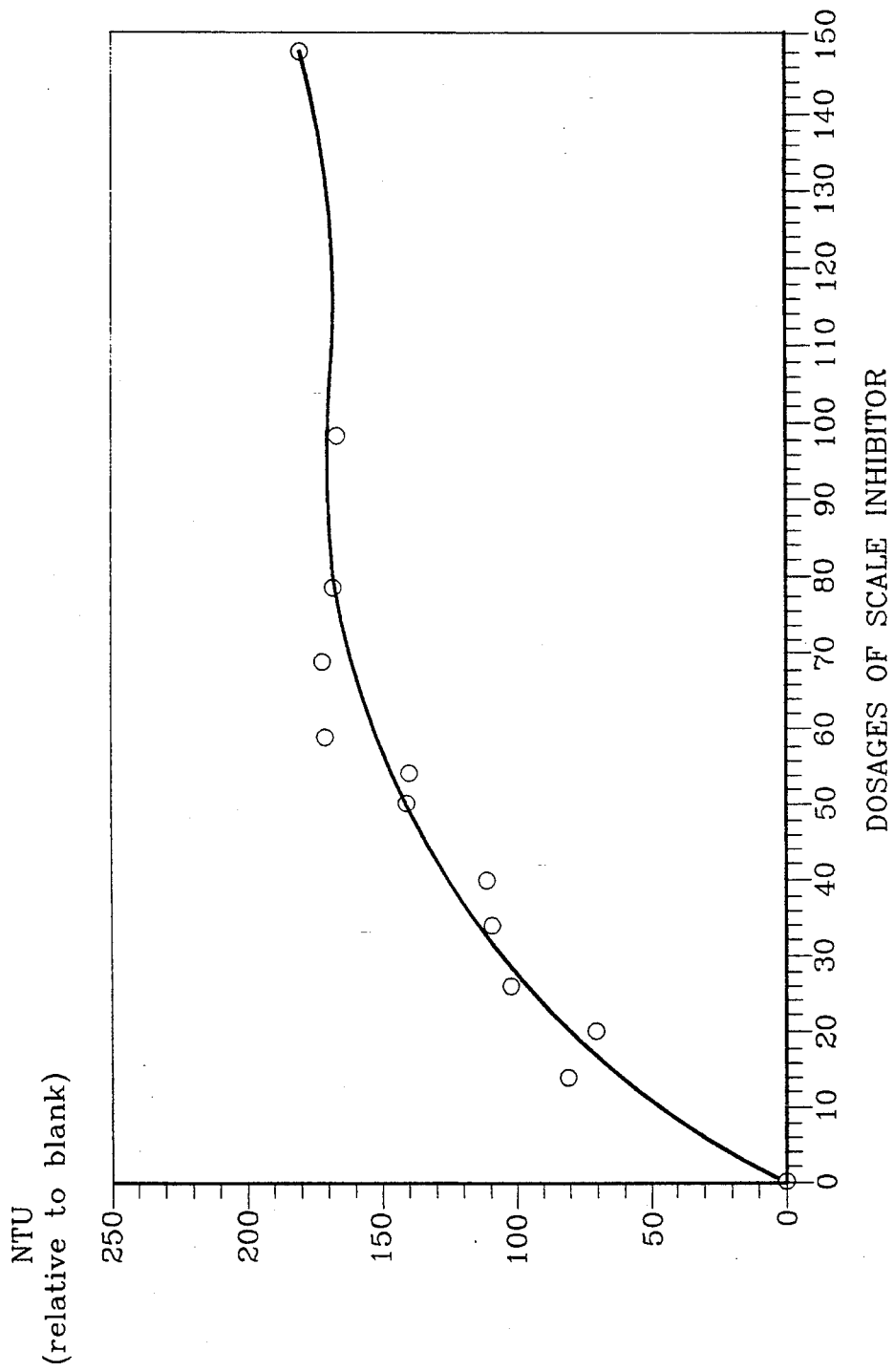
FIGURE

SCALE DEPOSITION INHIBITOR

CROSS-REFERENCE TO RELATED APPLICATION

This is a continuation-in-part of my earlier U.S. Ser. No. 07/694,008, filed Apr. 30, 1991 now abandoned.

FIELD OF THE INVENTION

This invention relates to the inhibition of scale deposition, and particularly to such inhibition in briny water containing carbonate, sulfide and iron.

BACKGROUND OF THE INVENTION

As oil is pumped from the ground, water typically seeps into the formation and the downhole pressure decreases. In a maturing well, the water cut of the production increases. A number of different techniques are used to increase oil recovery. A common method reinjects water into the formation to increase downhole pressure and flush residual oil into the producing wells. The oil-containing water may then be lifted by sucker rods and/or pumped to the surface by electrically powered submersible pumps placed downhole.

The downhole environment is particularly inhospitable to oil production equipment. In addition to corrosion, scale formation is a problem. Flush water containing a large amount of dissolved solids can form tenacious scales on equipment if co-ions are also present. Equipment subject to scale may require frequent cleaning or replacement. Scale formed by calcium carbonate, calcium sulfate, barium sulfate, dirt, and the like is typically encountered.

Various compositions are available for inhibiting scale formation from these typical scales. However, in some wells, zinc and/or lead sulfide is another source of scale. For example, water produced from wells of the upper mid-continent of the United States and along the Mississippi-Louisiana Gulf Coast contain relatively high concentrations of soluble Zn and/or Pb ions, typically as $[ZnCl_4]^{2-}$ and/or $[PbCl_4]^{2-}$ anion complexes. Kharaka et al., *Applied Geochemistry*, Vol. 2, Nos. 5-6, pp. 543-61, 1987 reported central Mississippi brine that contained 160,000-320,000 ppm of dissolved solids including 48,000 ppm Ca, 45 ppm Zn, 70 ppm Pb, 465 ppm Fe and 210 ppm Mn. Zinc sulfide scale can limit or even halt oil production by depositing on the interior surfaces of water carrying pipes or by causing oil pumps to stick or seize.

The calcium carbonate inhibitors are not generally effective in controlling these sulfide scales. Other dispersants have been developed specifically for the control of zinc sulfide scale, but adversely affect the performance of the calcium carbonate inhibitors, or are themselves adversely affected by the presence of the calcium carbonate inhibitors. In other words, calcium carbonate inhibitors and zinc sulfide dispersants which work well alone, do not generally work well in the same system. In addition, many of these inhibitors are adversely affected by the presence of iron.

As far as the applicant is aware, no technology has been developed for effectively controlling calcium carbonate and zinc sulfide deposits in an oil producing well in the presence of iron and therefore a need remains.

SUMMARY OF THE INVENTION

The present invention resides in the discovery of an inhibitor-dispersant system for effectively controlling calcium carbonate and zinc sulfide deposits, even in the presence of iron. The deposition can be effectively controlled by using a calcium carbonate inhibitor selected from phosphate esters and phosphonates in combination with a sulfide dispersant selected from alkyldiphenylether sulfonates.

In one aspect, the present invention provides an aqueous dispersion. The dispersion includes from about 1 to about 50 ppm of a calcium carbonate inhibitor selected from phosphate esters and phosphonates, from about 1 to about 50 ppm of a sulfide dispersant selected from sulfonated alkyldiphenylethers, and a scale producing amount of zinc and/or lead sulfide particulates effectively dispersed by the dispersant. The calcium carbonate inhibitor can be the reaction product of phosphorous acid, formaldehyde and amine, preferably a primary or secondary amine such as, for example, ammonia, ethylenediamine, hexamethylenediamine, diethylenetriamine and the like. Alternatively, the calcium carbonate inhibitor can be the reaction product of phosphorous acid and hydroxyalkylamine, such as, for example, triethanolamine. The sulfide dispersant preferably comprises mono- and/or disulfonated alkyldiphenylether, wherein the alkyl substituent has from 4 to 30 carbon atoms and can be either branched or linear. The dispersion can comprise a briny dispersion including 50,000 ppm or more of dissolved solids. The dispersion can further include calcium carbonate particulates and the presence of soluble iron or iron sulfide. The total (combined) concentration of dispersed ZnS and/or PbS particulates, particularly ZnS, is at least 1 ppm and can range from about 2 to about 200 ppm or more, preferably from about 5 to about 20 ppm.

In another aspect, the present invention provides a method for dispersing zinc sulfide and inhibiting calcium carbonate scale in an oil well operation. The method comprises determining the presence of zinc and/or lead sulfide and introducing a $CaCO_3$ inhibitor selected from phosphate esters and phosphonates and a ZnS and/or PbS dispersant selected from alkyldiphenyl oxide sulfonates to the oil well flush water. The dispersant and inhibitor are preferably dosed at from about 1 to about 50 ppm each. The flush water includes at least 1 ppm combined of zinc and/or lead in addition to calcium carbonate and iron. The flush water can have a total zinc and/or lead concentration, particularly zinc, of from about 2 to about 200 ppm or more, preferably from about 5 to about 20 ppm, wherein total dissolved solids comprises from about 50,000 ppm to about 400,000 ppm or more.

BRIEF DESCRIPTION OF THE DRAWING

The Figure is a graphical representation of the relative turbidity of ZnS brine dispersions above a blank versus dosages of the scale inhibitor of the present invention wherein no soluble iron is present.

DETAILED DESCRIPTION OF THE INVENTION

The aqueous carbonate and sulfide oil well scale inhibitor has enhanced activity in aqueous brine solution even in the presence of soluble iron as high as 100 ppm. Furthermore, it has been discovered that a good calcium carbonate inhibitor may be combined with a good zinc sulfide dispersant without adversely affecting the inhibition activity of the other component.

The first component of the scale inhibitor is the calcium carbonate (CaCO$_3$) inhibitor selected from phosphate esters and phosphonates. These compounds are thought to retard precipitation of CaCO$_3$ by modifying the crystalline structure of the molecule. As needle shaped crystals, CaCO$_3$ precipitates readily but in the presence of phosphate ester or phosphonate inhibitors, a less readily precipitating spherical crystalline structure is observed.

Phosphate ester and phosphonate compounds are known and may be prepared as the reaction product of phosphoric acid (H$_3$PO$_4$), such as polyphosphoric acid 115, and a hydroxyalkylamine, or by the reaction product of phosphorus acid (H$_3$PO$_3$), an amine and formaldehyde. Suitable hydroxyalkylamines include triethanolamine, diethanolamine, trimethanolamine, and the like. Suitable non-hydroxy substituted amines comprise ammonia and primary and secondary polyalkylene polyamines. Representative examples of the latter include ethylenediamine, hexamethylenediamine, diethylenetriamine, bishexamethylenetriamine (BHMT), and the like. Amines reactants are widely available; BHMT, for example, is sold by Monsanto Chemical.

Representative examples of phosphonate and phosphate ester inhibitors and preparation thereof are as follows:

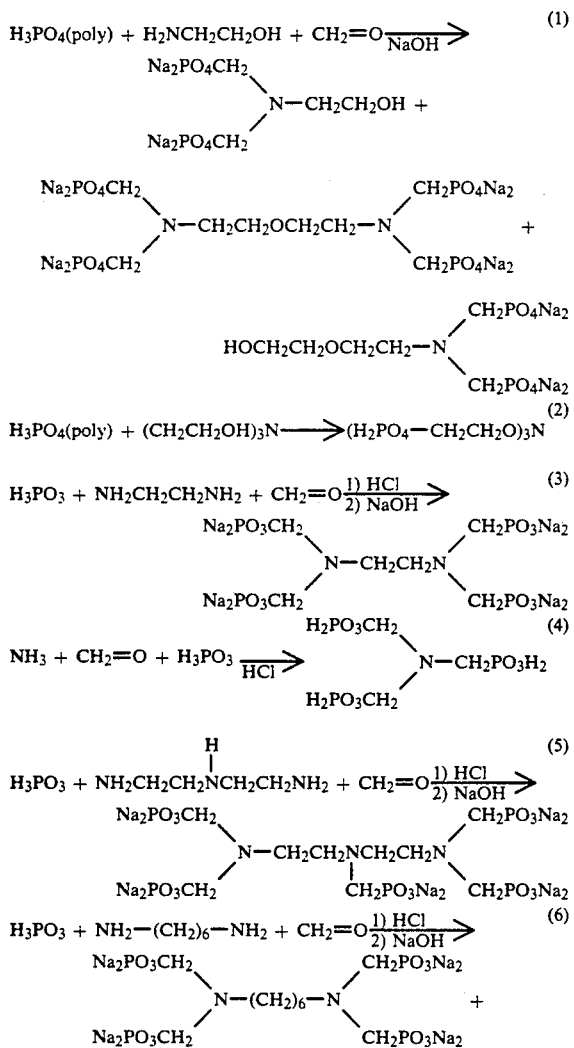

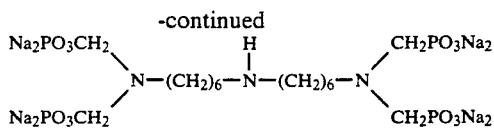

The phosphonate or phosphate ester component of the present invention comprises from about 1 to about 45 percent by weight of the inhibitor composition, preferably from 20 to about 45 percent by weight.

The second component of the inhibitor composition is a sulfide dispersant comprising mono- and/or disulfonated alkyldiphenylether (alkyldiphenyl oxide) compounds. The alkyl substituent of the diphenylether has from about 4 to about 30 carbon atoms and may be a straight or branched chain. Such compounds are widely available, and are sold, for example, under the tradenames DOWFAX by Dow Chemical.

Alkyldiphenylether sulfonate compounds are generally prepared as the reaction product of a diphenyl oxide with an olefin which is then sulfonated. As an example, the C$_{12}$ product may be made by reacting diphenyl oxide with a propylene tetramer. This is subsequently sulfonated on one or both phenyl rings with chlorosulfonic acid or sulfur trioxide. The sulfonated product is a mixture of the mono- and disulfonate product, generally 70 wt % disulfonate to 30 wt % monosulfonate.

The sulfide dispersant component comprises from about 1 to about 30 percent by weight of the inhibitor composition, preferably from about 10 to about 30 percent by weight.

The inhibitor optionally comprises one or more antifreeze additives such as ethylene glycol, methanol and the like. The anti-freeze additive comprises from 0 to about 30 percent by weight of the inhibitor composition as required for the desired degree of freeze protection. An ethylene glycol concentration of about 25 wt % will typically provide freeze protection to about −40° F.

The scale desposition inhibitor effectively inhibits calcium carbonate and disperses sulfide solids present in flush water pumped into a producing oil well which might otherwise deposit a scale in the drill string and pumping equipment. The flush water comprises from about to about 50 ppm of the calcium carbonate dispersant and from about to about 50 ppm of the sulfide dispersant, preferably from about 2 to about 25 ppm of each component.

The flush water may be suitably fresh, brine or seawater as is available at the well site, although brine is typically used. Supply water is generally drawn from the formation as a byproduct of oil production then reinjected under pressure. The inhibitor has been found to be particularly suited for use in high salt concentration brines taken from oil depleted formations or salt domes. As used herein, the inhibitor of the present invention is capable of dispersing calcium carbonate and zinc and/or lead sulfide particulates in briny flush water containing from 50,000 up to 400,000 ppm or more dissolved solids. The inhibitor of the present invention is suitable for use in briny water comprising at least 1 ppm total zinc and/or lead, particularly zinc. Preferably, the inhibitor of the present invention is suitable for use in briny water comprising a combined zinc and/or lead concentration of from about 20 ppm to about 200 ppm or more, especially from about 5 to about 20 ppm. Furthermore, it has been found that the scale inhibition activity of the present inhibitor is not substantially adversely effected by the presence of dissolved iron or iron sulfide at concentrations of from about 50 to about 100 ppm or more.

In the practice of the present invention, the aqueous dispersion formed comprises effectively dispersed calcium carbonate and zinc and/or lead sulfide particulates preferably in brine. The total concentration of dispersed zinc and/or lead sulfide particulates is at least 1 ppm, but generally ranges between about 2 ppm to about 200 ppm combined, and especially from about 5 to 20 ppm.

The inhibitor composition may be added to the flush water injection system at the suction of the injection pump, suction additive tank, water makeup supply line, or any other suitable location as is known in the art.

The present invention is illustrated by way of the following examples:

EXAMPLES

Turbidity measurements are made using a HACH Ratio/XR Turbidimeter which is a laboratory nephelometer capable of measuring turbidities up to 1,999 nephelometric turbidity units (NTU). Basically, a beam of light is directed through the test samples and detectors are place to measure 90° light scatter, the forward scattering light and the transmitted light. A larger NTU reading indicates a more effective dispersion.

EXAMPLE 1

A phosphonate $CaCO_3$ inhibitor compound was prepared in a glass-lined reactor equipped with an overhead condenser. An aqueous solution of phosporous acid (39.2 g) was charged into the reactor. The solution was 65-70 percent by weight acid and was adjusted with water or concentrated acid as desired. The vessel was cooled by a water jacket and 13.1 g of 84 wt % of hexamethylenediamine in water was slowly added. An exotherm increased the reaction temperature to 80° C. and the reaction was maintained at this temperature until all the amine was added. Next, 5.38 g of 36 % HCl was added and the reaction temperature was raised to 90° C. Formaldehyde (16.6 g) was added and the reaction was refluxed at about 103° C. for 2 hours. The product contained less than about 269 mg/l formaldehyde. If an excess of this component was present, the reaction was continued for an additional 0.5 hour. The reaction effluent was cooled to 50° C. and 21.7 g NaOH (50 % solution) was added. The neutralized product was mixed for 15 minutes. The mixture was filtered through a sparkler filter so that the final product is clear (ASTM color index of 3 maximum).

EXAMPLE 2 AND COMPARATIVE EXAMPLES 1-10

Several known zinc sulfide inhibitor/dispersants were screened for activity in brine, specifically, a brine present in the Williston Basin well sites in N.D. For the tests, a simulated brine comprising 45,000 mg/l $Ca^{+2}$, 3,100 mg/l $Mg^{+2}$, 84,000 mg/l Na and 218,000 mg/l Cl. was prepared. The brine had a pH 5.8 and a conductivity of 316,000 μMhos.

A first test procedure comprised mixing 10 mg/l $Zn^{+2}$ ($ZnCl_2$), 10 mg/l $S^{-2}$ ($Na_2S\cdot 9H_2O$) and 10-50 mg/l of the inhibitor in question in 100 ml total volume of Terra Resources brine. The solutions were shaken thoroughly and stored in a water bath at 140° F. for 18 hours to simulate downhole conditions. These solutions were then filtered through a 0.45 μm MILLIPORE filter membrane and the filtrate was analyzed for total zinc concentration by Inductively Coupled Argon Plasma (ICAP).

A second procedure used a stir and settle technique to determine the ability of a dispersant additive to prevent pre-formed ZnS from settling. Two hundred fifty mg of ZnS was carefully weighed into aluminum weighing boats and transferred to 1,200 ml glass beakers. About 500 ml of synthetic brine was added to the beakers along with 10 mg of active ZnS dispersant. The beakers were filled to the 1,000 ml mark with additional brine for a dispersant concentration of 10 ppm and a ZnS concentration of 250 ppm. The beakers were then placed on a six-bladed Phipps and Bird stirrer at maximum rpm for 10 min followed by 20 min of stirring at 100 rpm. The stirrer blades were lifted and the suspensions were allowed to settle undisturbed for 1 hour. Thirty ml of the test solution was withdrawn at the "700 ml" mark on the beaker using a glass syringe and placed in a cuvette for measuring turbidity. Turbidities were measured using the 0-2,000 NTU scale.

Results of the dispersion test procedure are shown in Table 1. None of the products tested (and described in Table 1) showed any tendency to prevent ZnS formation However several good ZnS dispersants were evident. All the standard polymer dispersants which typically do well in fresh water did poorly in the brine. It was additionally noted that ZnS settling in a brine blank was slower than in a fresh water blank due to the higher density of the brine as compared to fresh water.

TABLE 1

| Example | ZnS Dispersant | Turbidity[a] (NTU) |
|---|---|---|
| comp 1 | oleylamine ethoxylate | −81 |
| comp 2 | modified polyacrylate terpolymer | 0 |
| comp 3 | poly(acrylate-acrylamide) and poly(aminomethyl sulfonate) | 6 |
| comp 4 | poly(ethylacrylate-acrylic acid) | −15 |
| comp 5 | polyacrylate | −3 |
| comp 6 | poly(acrylate-acrylamide) | 31 |
| comp 7 | poly(aminomethyl sulfonate) | 67 |
| 2 | alkyldiphenylether sulfonate | 188 |
| comp 8 | vinyl sulfonate-styrene-maleic acid polymer | 109 |
| comp 9 | poly(vinyl sulfonate) | −7 |
| comp 10 | poly(hydroxyethylacrylate-acrylic acid) | 3 |

[a]relative to a blank

EXAMPLE 3

Example 1 $CaCO_3$ inhibitor and Example 2 ZnS dispersant were formulated into the combination inhibitor/dispersant of the present invention. Further ZnS suspension tests were run in synthetic brine at varying inhibitor concentrations. The formulation comprised 45 wt % Example 1 $CaCO_3$ inhibitor, 30 wt % Example 2 ZnS dispersant and 25 wt % ethylene glycol. Results shown in the Figure indicate that the presence of the $CaCO_3$ inhibitor had substantially no adverse effect on ZnS dispersability.

EXAMPLE 4

In the following example, synthetic brine containing 50 ppm concentration of the scale inhibitor of Example 3 was tested for ZnS dispersability in the presence of varying concentrations of soluble iron. Results shown in Table 2 indicate that up to 100 ppm iron did not substantially adversely effect the ZnS dispersability of the present invention.

TABLE 2

| Iron Conc. (ppm) | Turbidity[a] (NTU) |
|---|---|
| 0 | 145 |
| 10 | 147 |
| 20 | 150 |
| 30 | 122 |
| 100 | 157 |

[a] relative to a blank containing no inhibitor

EXAMPLE A

Well A located in North Dakota had a history of zinc sulfide plugging problems. Deposits on pump parts and tubing were so severe that the typical uninterrupted run time was less than one month. Analysis of deposits from the pump internals showed a predominance of zinc sulfide. Normal levels of total zinc in the produced water from this well were 2.0 mg/l. After introduction of the scale inhibitor-dispersant of Example 3, the total zinc levels in the produced water increased to 13.0 mg/l. Well A has operated continuously for over 9 months failure free which is the longest uninterrupted run time in the history of the well.

EXAMPLE B

Well B also in North Dakota had similar severe plugging problems due to zinc sulfide, zinc oxide and hydrocarbon residues. Pump failure was a monthly occurance. Average zinc levels in the produced water before treatment with the scale inhibitor-dispersant of Example 3 were about 2.0 mg/l. After addition of the Example 3 composition at a concentration of 95 mg/l into the well annulus, total zinc levels in the produced water more than quadrupled to 8.4 mg/l. Well B has since operated trouble free for over 10 months.

The foregoing description of the invention is illustrative and explanatory thereof. Various changes in the materials, apparatus, and particular parts employed will occur to those skilled in the art. It is intended that all such variations within the scope and spirit of the appended claims be embraced thereby.

What is claimed is:

1. An aqueous dispersion, comprising:
   from about 1 to about 50 ppm of a $CaCO_3$ inhibitor selected from phosphate esters and phosphonates;
   from about 1 to about 50 ppm of a sulfide dispersant selected from alkyldiphenyl oxide sulfonates; and
   a scale producing amount of particulates comprising zinc and/or lead sulfide effectively dispersed by said inhibitor and dispersant.

2. The dispersion of claim 1 comprising at least 1 ppm total zinc and/or lead.

3. The dispersion of claim 1 comprising from about 2 to about 200 ppm total zinc and/or lead.

4. The dispersion of claim 3, wherein said effectively dispersed particulates include $CaCO_3$.

5. The dispersion of claim 4, wherein said particulates are dispersed in the presence of iron.

6. The dispersion of claim 1, wherein said $CaCO_3$ inhibitor comprises the reaction product of phosphorous acid, formaldehyde and amine.

7. The dispersion of claim 6, wherein said amine is a primary or secondary amine.

8. The dispersion of claim 6, wherein said amine is selected from ammonia, ethylenediamine, hexamethylenediamine, and diethylenetriamine.

9. The dispersion of claim 1, wherein said $CaCO_3$ inhibitor comprises the reaction product of phosphorous acid and hydroxyalkylamine.

10. The dispersion of claim 9, wherein said hydroxyalkylamine comprises triethanolamine.

11. The dispersion of claim 1, wherein said sulfide dispersant comprises mono- and disulfonated alkyldiphenyl oxide.

12. The dispersion of claim 11, wherein the alkyl substituent of said diphenyl oxide has from 4 to about 30 carbon atoms.

13. The dispersion of claim 12, wherein said alkyl substituent is branched.

14. The dispersion of claim 12, wherein said alkyl substituent is straight chain.

15. A method for inhibiting zinc sulfide and calcium carbonate scale in oil well operations, comprising the steps of:
   determining the presence of zinc and/or lead sulfide scale producing particulates in oil well flush water; and
   introducing a $CaCO_3$ inhibitor and sulfide dispersant to said oil well flush water, said inhibitor selected from phosphate esters and phosphonates, said dispersant selected from alkyldiphenyl oxide sulfonates.

16. The method of claim 15, wherein said inhibitor and dispersant are dosed at from about 1 to about 50 ppm each.

17. The method of claim 15, wherein said flush water comprises soluble calcium and at least about 1 ppm zinc and/or lead.

18. The method of claim 15, wherein said flush water comprises soluble calcium and from about 2 to about 200 ppm of zinc and/or lead.

19. The method of claim 18, wherein said flush water comprises from about 5 to about 20 ppm zinc.

20. The method of claim 18, wherein said flush water comprises from about 5 to about 20 ppm lead.

* * * * *